3,817,755
ANTISTATIC PHOTOGRAPHIC FILM
E. Scudder Mackey, Binghamton, Richard J. Papp, Vestal, and James Waring, Binghamton, N.Y., assignors to GAF Corporation, New York, N.Y.
No Drawing. Filed Aug. 10, 1972, Ser. No. 279,665
Int. Cl. G03c 1/82
U.S. Cl. 96—87 A
11 Claims

ABSTRACT OF THE DISCLOSURE

The static susceptibility of film supports, such as photographic motion picture film supports, especially of the aerial type, can be protected against static susceptibility by applying, coating or swabbing an inert film support or the uncoated side of a finished photographic film with a cycloaliphatic amine salt of an alcohol sulfate in which at least one alicyclic radical containing at least five carbon atoms is attached to the amine nitrogen atom and the alcohol radical of the alcohol sulfate has at least five carbon atoms and the compound altogether contains at least sixteen carbon atoms.

BACKGROUND OF THE INVENTION

(1) Field of the Invention

This invention relates to photographic film and particularly to photographic film having improved antistatic properties, and to a method of producing such antistatic photographic film.

(2) Discussion of the Prior Art

Considerable difficulty is encountered during the manufacture and use of photographic film because of the accumulation of electrical charges on the film. These static electrical charges are produced by friction of the film from rollers or other parts of the machine through which it passes, by slitting or by unwinding the film, by contact with dissimilar surfaces, by handling the film, or by other causes all too well known to those experienced in the manufacture and use of photographic film. Such discharges can also occur in film such as motion picture film when it is transported rapidly through a camera. Static discharges occurring in film prior to development manifest themselves after processing by the formation of irregular streaks or patterns or lines in the film caused by lightning-like exposures of the emulsion at such portions. A processed film may also accumulate electrical charges which make it susceptible to dust, lint, and particle contamination. This is particularly aggravating during a projection of slides or motion picture film where the lint or other contaminates distort the viewing or even scratch the film and ruin the picture.

The prior art is replete with approaches to the solution of the problem of accumulated electrical charges upon photographic film. For example, see United States Pats. 2,074,647, 2,584,337, 2,649,374, 2,725,297, 3,399,995, 3,437,484, 3,625,695, 3,630,742 and German Pat. 1,075,- 941 discussing treatment of films with resinous or polymeric antistats. These prior art antistats, although effective in improving the antistatic properties of the film, nevertheless are deficient in certain respects, for example, the antistat layer rubs off in use and causes an undesirable accumulation of dust or flakes in the camera. Furthermore, these antistatic compositions form insoluble slurries or flocculent masses during processing treatment of the base film, thereby creating processing difficulties.

Likewise, polymers and copolymers described in U.S. Pat. 2,074,647, which have to be applied before the emulsion coatings, are usually quite tacky to the extent that they are subject to offset and blocking. This is particularly troublesome during the unwinding of the filmbase, which precedes the emulsion coating operation, when the offset areas can produce uneven coating areas and even contribute to increased static discharge. Furthermore, if the roll is coated with a photographic emulsion system, the antistat polymers of 2,074,647 may offset to the sensitized side causing undesirable physical appearance.

The principal object of the present invention, therefore, is to provide photographic film supports, particularly of the aerial type, which obviate or at least significantly minimize the foregoing problems. It is also an object of this invention to provide photographic film supports possessing improved antistatic properties and slippage characteristics.

SUMMARY OF THE INVENTION

In accordance with this invention it has been found that the static susceptibility of film supports, such as photographic motion picture film supports, especially of the aerial type, can be protected against static susceptibility by applying, coating or swabbing an inert film support or the uncoated side of a finished photographic film with a cycloaliphatic amine salt of an alcohol sulfate in which at least one alicyclic radical containing at least five carbon atoms is attached to the amine nitrogen atom and the alcohol radical of the alcohol sulfate has at least five carbon atoms and the compound altogether contains at least sixteen carbon atoms. It is preferred to treat the inert film base with a solvent rinse containing an antistatic amount of a fatty alcohol amine sulfate composition such as exemplified by the following formula:

$$RR'R''NHSO_4Y$$

wherein R is a cyclohexyl radical, R' and R" are alkyl groups containing no more than three carbon atoms and Y is a normal primary aliphatic hydrocarbon radical having about 8 to about 20 carbon atoms. The diethylcyclohexylamine salt of lauryl sulfate (known in the trade as "DUPONOL" G SURFACE ACTIVE AGENT, See E. I. du Pont de Nemours & Co., Inc. Industrial Chemicals Information Bulletin, 1M965) is especially preferred for use in this invention.

Generally, the antistat concentration falls within the range of 0.05 to 1.5% based on solvent volume. Although any inert solvent can be employed, the solvent media generally is of the polar type such as conventional mixtures of methanol, ethanol, acetone, or ethylene glycol monomethyl ether. The alcohols may vary from 30–50 parts;

the acetone from 10–18 parts and the ethylene glycol monomethyl ether from 30–55 parts.

The antistatic photographic films produced in accordance with this invention have a significantly lower surface reactivity combined with excellent adherence characteristics which it is believed are unobtainable with any prior art photographic antistatic composition. Furthermore, the antistatic photographic compositions of this invention are produced without the undesirable effect obtained with prior art films treated with an antistatic backwash prior to emulsion coating, e.g. tackiness to the extent that the film is subject to offset in blocking.

DETAILED DESCRIPTION OF THE INVENTION

In accordance with the present invention, the above defined antistat can be dispersed in a suitable solvent such as water and preferably a lower boiling alcohol such as methanol, ethanol, propanol, or isopropanol and applied to the inert plastic filmbase by coating, dipping, brushing, or other usual ways of applying a solution or dispersion of an antistat to an inert plastic filmbase. It is preferred to employ a conventional bead application technique as described in U.S. Pat. 3,359,126. Subsequently, the coated, inert plastic filmbase is dried to produce a final product containing ultra-thin layer of the antistat. (The thickness of the dried antistatic layer can range from about 0.05 to 1 micron in thickness, depending upon the strength of the solution, and to a lesser extent upon the coating speed.) The amount of total solids deposited upon the inert plastic filmbase can be varied from 0.5 to 10 milligrams per square foot, as desired, by changing the concentration of the antistat in the solution employed for the coating or dipping operation.

Inert plastic filmbases contemplated for use in the instant invention can be any conventional transparent material suitable for photographic use such as a cellulose organic ester, for example, cellulose acetate, cellulose formate, cellulose propionate, cellulose butyrate, cellulose acetate-propionate, cellulose acetate-butyrate, and the like, or cellulose nitrate as well as film-forming polymers, such as polyvinyl chloride, copolymers of vinyl chloridevinyl acetate, copolymers of vinyl chloride-vinylidine chloride, polyamides, polystyrene, polycarbonates, polyethylene terephthalate, and the like. The materials are well known and commercially available and therefore are not detailed here (see for example, U.S. Pats. 3,630,742; 3,625,695; or 3,437,484).

In evaluating the relative static susceptibility of treated films prepared in accordance with the principles of this invention certain tests were conducted to determine the conductivity and resistivity of the treated films under test.

The relative static susceptibility can be determined by conductivity and resistivity measurements or by the use of the static generating and measuring device described in U.S. Pat. 2,584,337. For a practical test which shows the actual static marks photographically, the film sample, which is provided with a highly sensitive silver halide emulsion layer, is submitted to the action of a highly effective static generator. For instance, the sample is placed on an insulated polystyrene plate and rubbed back and forth a predetermined number of times (usually 20 times) in the absence of light with a nylon covered sponge rubber cushion. Development of the film with a suitable developer solution shows up the static marks and permits a practical evaluation of static susceptibility with the relative grades of static assigned as follows: none; very light; light; medium; heavy; very heavy.

Another static generating test can be made simply by rubbing the film a predetermined number of times with the fingers in a controlled environment. This is called the "Finger rub" test and can simulate handling of the film during loading in the camera (threading, etc. with the fingers) or rubbing or guiding the film while splicing or loading the film into a processing unit for development. Again the film is developed as above to evaluate the degree of static susceptibility.

Surface resistivity, as defined inter alia in U.S. Pat. 2,649,374 is an indication of the electrical resistance of the backing side of a film sample. It is determined by measuring the resistance in megohms between two electrodes. These values are influenced by the width and the spacing between the electrodes, but this influence can be disregarded because the electrodes and their distance from each other are not changed during the comparison tests.

The following examples describe the manner in which the treatment of a film support is effected. These examples are included for purposes of illustration only and are not intended to be construed as limiting the scope of the invention.

EXAMPLE 1

A solvent coating solution containing 35 parts acetone, 65 parts methanol and 0.1% (based on solvent volume) of diethylcyclohexylamine salt of lauryl sulfate was coated on a four mil polyester film base by conventional bead application technique. This resulted in a completely transparent coating layer on one side of the film base. Subsequently, after drying, the antistat coated film base and the same film base coated with solvent without antistat control was conditioned at 50% relative humidity and 70° F. and static susceptibility measurements, as expressed by surface resistivity, at 50% relative humidity, were made by using contact electrodes 2 millimeters apart and 4 inches long. The surface resistivity of the antistatic film base was found to be $1.2 \times 10^3$ megohms, whereas that of the uncoated control was $100 \times 10^4$ megohms, an unacceptable level.

EXAMPLE 2

A solvent coating solution containing 45 parts methylcellosolve (ethylene glycol monomethylether), 40 parts ethanol, 15 parts acetone, and 0.33 percent (based on solvent volume) of diethylcyclohexylamine salt of lauryl sulfate was coated on polyester film base by conventional bead application technique. After drying, the resistivity of the antistat coated film base was compared with film base which had been coated with solvent but no antistat, in accordance with the measurement techniques set forth in Example I. The surface resistivity of the control was $100 \times 10^4$ megohms whereas that of the sample coated with the antistat was found to be $1.2 \times 10^3$ megohms.

EXAMPLE 3

The untreated controls and antistat treated polyester film bases of Examples 1 and 2 were then coated on the opposite side with a conventional bromoiodide silver halide emulsion of the aerial film type as follows:

The emulsion contained a hardener, a sensitizing dye combination, a stabilizer, and a coating aid. This emulsion layer was overcoated with an antiabrasion surface layer containing a hardener and a coating aid. The coating method utilized corresponds to the multiple layer coating techniques of the type described inter alia in U.S. Pat. 2,761,419 or 2,761,791.

Prior to processing, the film was finger rubbed 20 times (after being conditioned for 20 hours in a 15% relative humidity environment). An examination of the processed film demonstrated that the control film had medium to heavy static discharge marks on all samples whereas the antistat treated film showed no static defects.

In the following examples, when the procedure of Example 1 is repeated using different antistats, film bases, solvents and antistat concentrations, as set forth in the following Table I, antistat coated film bases demonstrating satisfactory antistatic properties for photographic use are obtained.

TABLE I

RR'R"NHSO₄Y

| Example | R | R' | R" | Y | Film base | Solvent system | Antistat concentration,* percent |
|---|---|---|---|---|---|---|---|
| 4 | Cyclohexyl | Methyl | Methyl | n-Octyl | Polyester | (¹) | 0.3 |
| 5 | do | do | Ethyl | n-Nonyl | do | (¹) | 0.3 |
| 6 | do | Ethyl | do | n-Decyl | do | (¹) | 0.3 |
| 7 | do | Methyl | n-Propyl | n-Undecyl | do | (¹) | 0.3 |
| 8 | do | Ethyl | do | n-Dodecyl (n-lauryl) | do | (¹) | 0.3 |
| 9 | do | n-Propyl | do | n-Tridecyl | do | (¹) | 0.3 |
| 10 | do | Ethyl | Ethyl | n-Tetradecyl | do | (¹) | 0.3 |
| 11 | do | do | do | n-Pentadecyl | do | (¹) | 0.3 |
| 12 | do | do | do | n-Hexadecyl | do | (¹) | 0.3 |
| 13 | do | do | do | n-Heptadecyl | do | (¹) | 0.3 |
| 14 | do | Methyl | Methyl | n-Octadecyl | do | (¹) | 0.3 |

¹ Methyl cellosolve 45 parts; ethanol 40 parts; acetone 15 parts.
*Percent of solvent volume.

What is claimed is:

1. A light sensitive photographic element comprising a film support carrying a silver halide emulsion layer, said element having an antistatic layer comprising a compound of the formula:

RR'R"NHSO₄Y wherein R is cyclohexyl and R' and R" are alkyl of up to three carbons, Y is a normal primary aliphatic hydrocarbon group having between eight and twenty carbons.

2. The photographic element of claim 1 wherein said layer comprises the diethylcyclohexylamine salt of lauryl sulfate.

3. The photographic element of claim 1 wherein said layer ranges in thickness from about 0.05 to 1 micron.

4. A photographic element comprising a film base coated on one side with a light sensitive gelatino silver halide emulsion, suitable for use in aerial photography, and on the opposite side of said film base a backing layer comprising an antistatically effect amount of a fatty alcohol amine sulfate antistat of the formula:

RR'R"NHSO₄Y wherein R is a cyclohexyl group, R' and R" are alkyl groups containing no more than three carbons and Y is a normal primary aliphatic hydrocarbon group having between about eight and twenty carbons.

5. The photographic element of claim 4 wherein said emulsion comprises a conventional bromoiodide silver halide emulsion of the aerial film type.

6. The photographic element of claim 4 wherein said amine sulfate is the diethylcyclohexylamine salt of lauryl sulfate.

7. The photographic element of claim 5 wherein said amine sulfate is the diethylcyclohexylamine salt of lauryl sulfate.

8. The element of claim 1 wherein R is cyclohexyl.
9. The element of claim 1 wherein R is cyclopentyl.
10. The element of claim 1 wherein R is cycloheptyl.
11. The element of claim 1 wherein R is cyclooctyl.

References Cited
UNITED STATES PATENTS
3,547,643   12/1970   Pechmann _____ 96—87 A RONALD H. SMITH, Primary Examiner U.S. Cl. X.R.
96—114.2, 114.5